Sept. 25, 1945.  G. C. PAXTON ET AL  2,385,462
STAMPING MACHINE
Filed Oct. 30, 1941    5 Sheets-Sheet 2
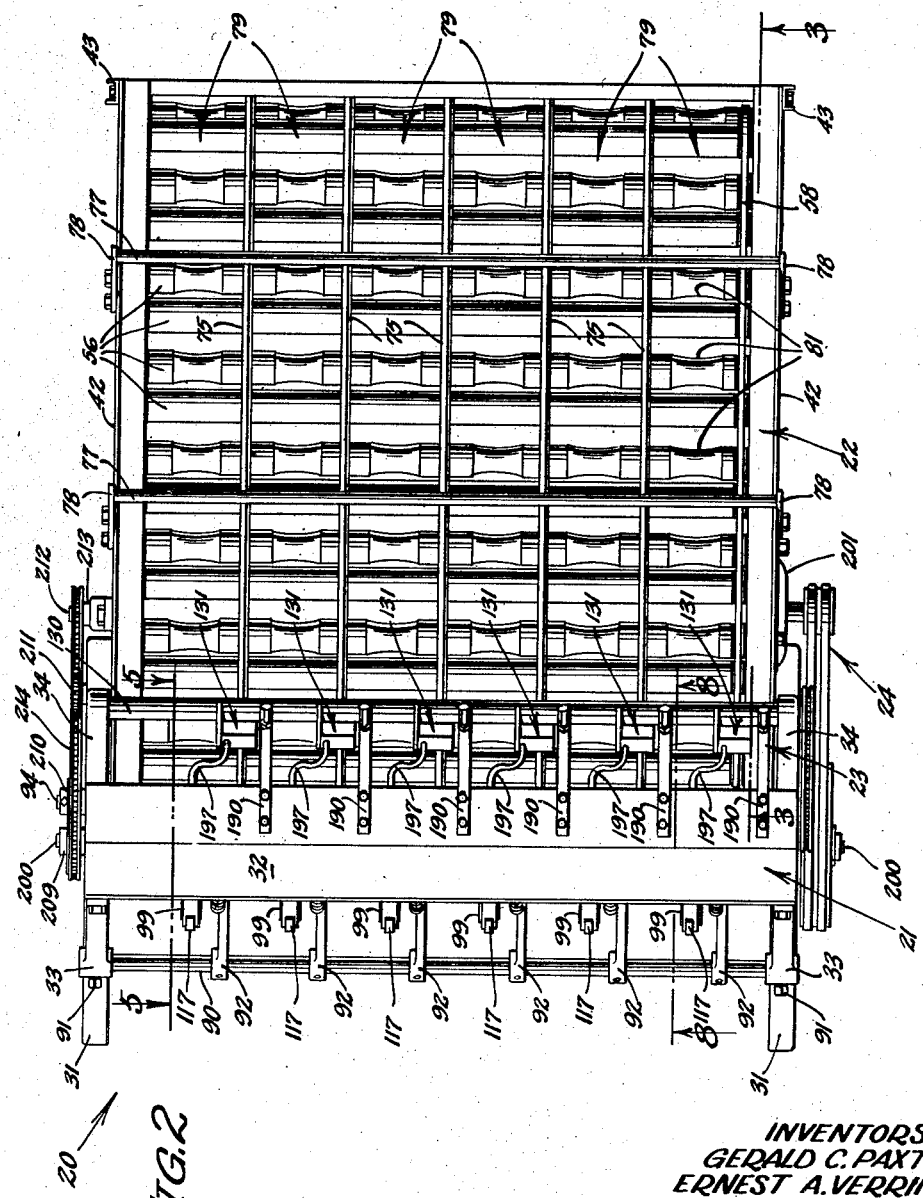
FIG.2
INVENTORS:
GERALD C. PAXTON
ERNEST A. VERRINDER
BY
ATTORNEY Sept. 25, 1945.   G. C. PAXTON ET AL   2,385,462
STAMPING MACHINE
Filed Oct. 30, 1941   5 Sheets-Sheet 3
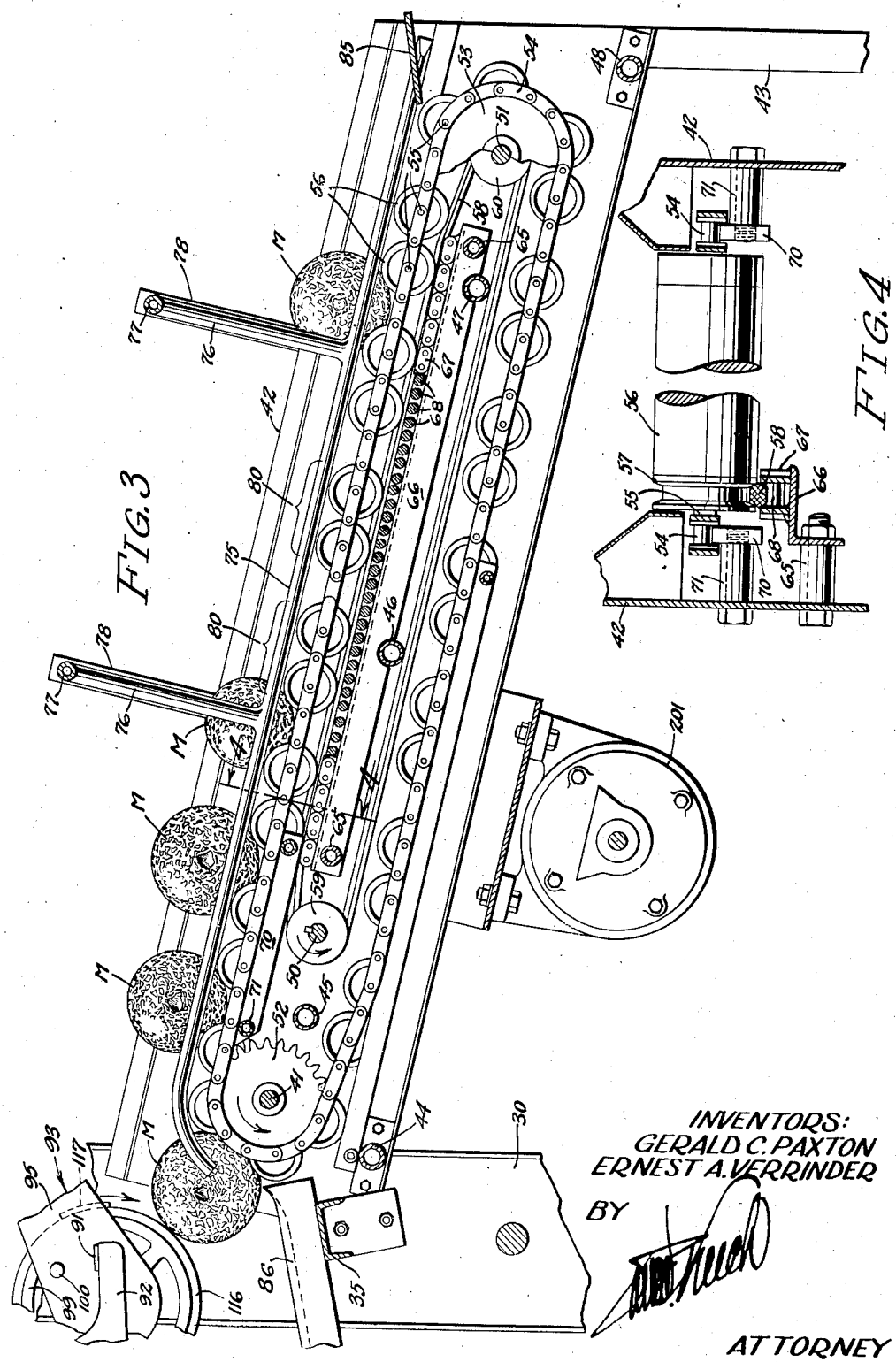
INVENTORS:
GERALD C. PAXTON
ERNEST A. VERRINDER
BY
ATTORNEY

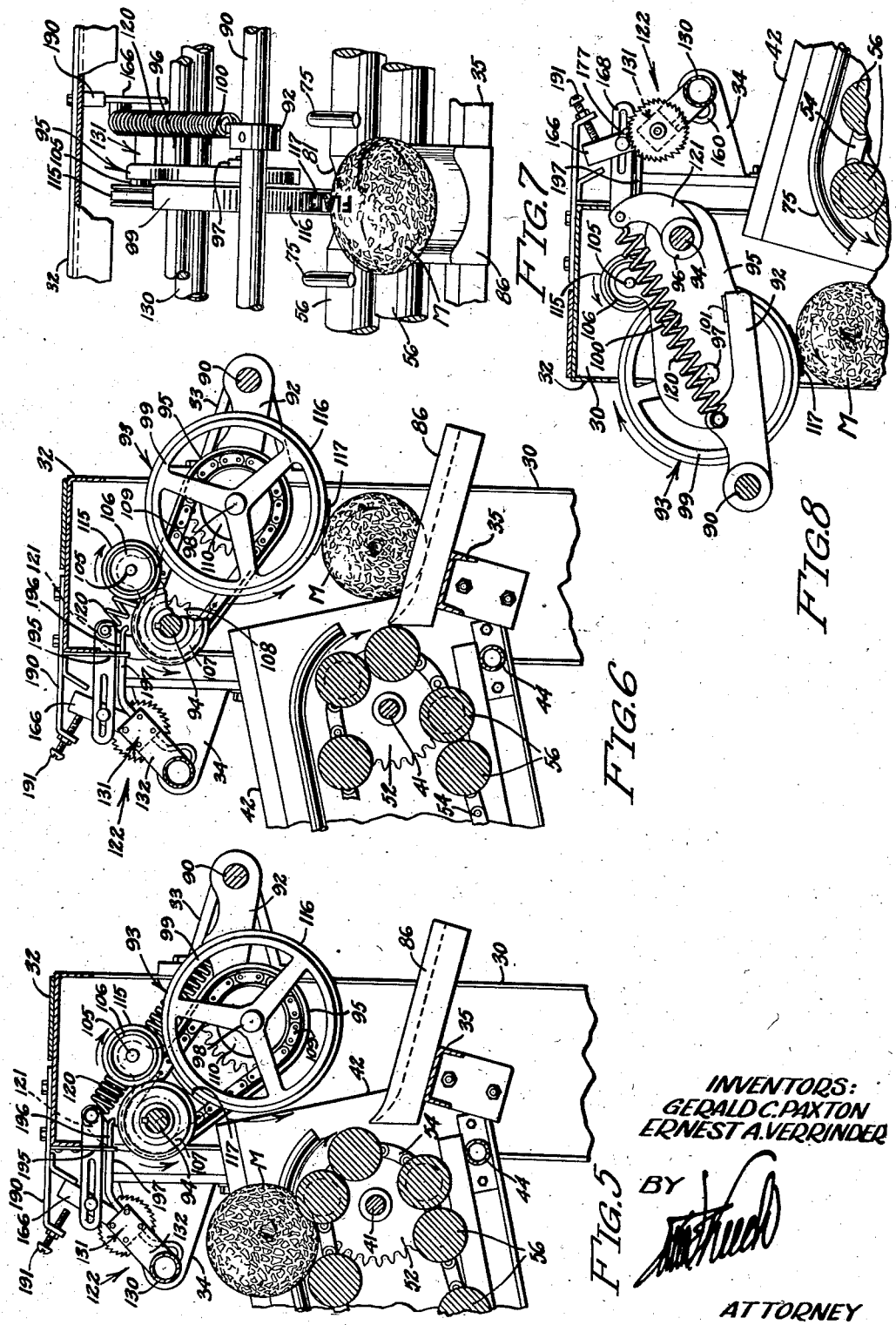

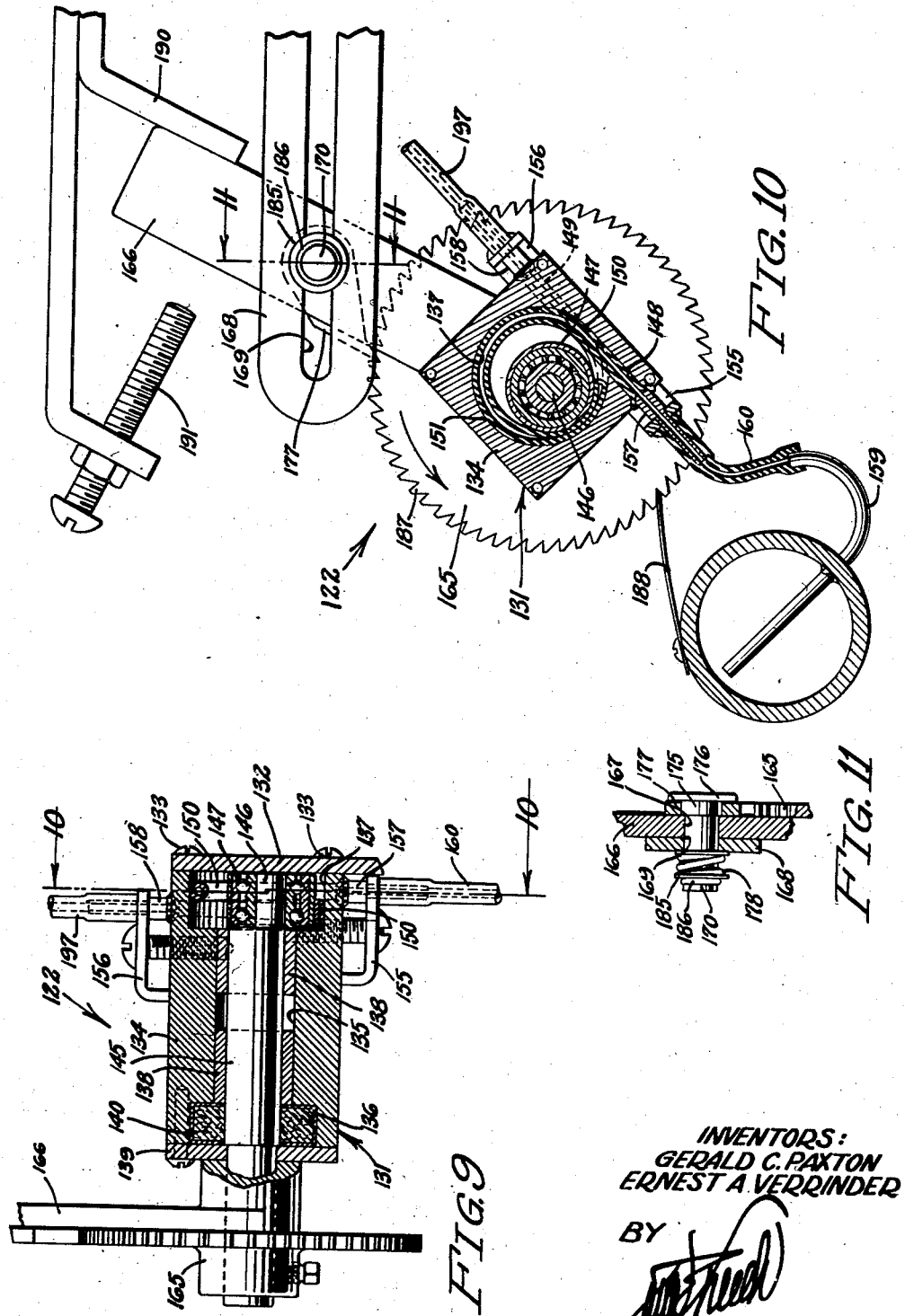

Patented Sept. 25, 1945

2,385,462

UNITED STATES PATENT OFFICE 2,385,462

STAMPING MACHINE

Gerald C. Paxton, Riverside, and Ernest A. Verrinder, Redlands, Calif., assignors to Food Machinery Corporation, San Jose, Calif., a corporation of Delaware Application October 30, 1941, Serial No. 417,082

7 Claims. (Cl. 101—36)

This invention relates to stamping machines and has particular utility in the fruit stamping art.

While trade-marking practices have made it desirable to stamp a considerable portion of the higher grade fruits and nuts, such as cantaloupes, citrus fruits, walnuts, etc., with trade-marks applied to each entity of the product, considerable difficulty has been experienced in doing a satisfactory job of printing these marks.

It is therefore an object of this invention to provide a novel stamping machine adapted for applying trade-marks to individual entities of fresh farm products, such as those fruits, vegetables and nuts which are susceptible to being stamped with a mark.

Because of the irregular shape and very rough outer skin no satisfactory way has hitherto been found for machine-stamping trade-marks on cantaloupes, yet it has been found highly desirable to trade-mark these individually.

It is therefore another object of our invention to provide a stamping machine which is peculiarly suitable for stamping trade-marks on cantaloupes and other melons.

Most of the rollable objects, including those above mentioned, upon which it has been found desirable to stamp a mark, are ovaloid in character. To apply the stamp uniformly by mechanical means to such an object it is almost essential that the object be uniformly presented to the type. The simplest way to do this is to present the object to the type with the object rotating about the axis of its maximum diameter, which will be referred to hereinafter as its "major axis." Attempts have been made to do this in the prior art, but these have been only partially successful.

It is accordingly a still further object of our invention to provide a stamping machine for rollable objects in which the object is uniformly presented to the type while it is rotating about its major axis.

The manner of accomplishing the foregoing objects, as well as further objects and advantages, will be made manifest in the following description taken in connection with the accompanying drawings, in which:

Fig. 2 is a plan view of Fig. 1.

Fig. 3 is an enlarged fragmentary cross sectional view taken on the line 3—3 of Fig. 2.

Fig. 4 is a still further enlarged fragmentary view taken on the line 4—4 of Fig. 3 and illustrating the details of the conveyor roller spinner device of the invention.

Fig. 5 is an enlarged fragmentary cross sectional view taken on the line 5—5 of Fig. 2, showing the stamping mechanism of the invention just prior to performing the stamping operation on a melon.

Fig. 6 is a view similar to Fig. 5 and illustrates the stamping device of the invention in the midst of a stamping operation.

Fig. 7 is a front view of Fig. 6.

Fig. 8 is an enlarged fragmentary cross sectional view taken on the line 8—8 of Fig. 2 and looking in the opposite direction to that from which Fig. 5 was taken.

Fig. 9 is an enlarged sectional view of the ink pump of the invention.

Fig. 10 is a cross sectional view taken on the line 10—10 of Fig. 9.

Fig. 11 is a fragmentary sectional view taken on the line 11—11 of Fig. 10.

Figure 1:
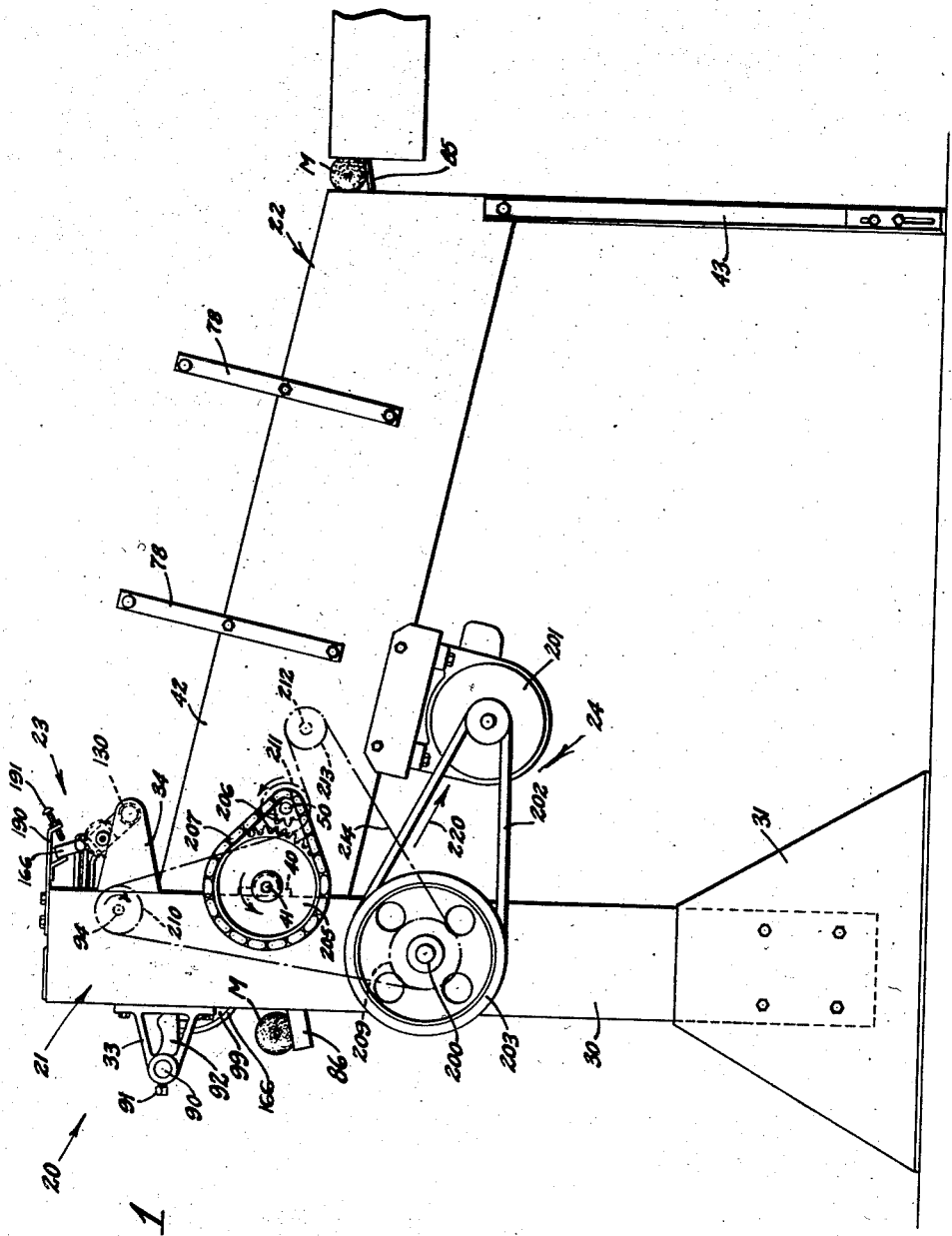
Fig. 1 is a side elevational view of a preferred embodiment of the invention.

Referring specifically to the drawings, the stamping machine 20 shown therein includes a frame 21, a melon aligning and feeding conveyor 22, a stamping mechanism 23 and a drive mechanism 24.

Frame 21

The frame includes a pair of standards 30, having pedestals 31 and joined at their upper ends by a cap plate 32. The standards 30 are provided with brackets 33 and 34, these standards also being connected by a channel iron 35.

Conveyor 22

Provided on the standards 30 is a pair of bearings 40, (see Fig. 1) in which is journalled a shaft 41, this shaft supporting the upper end of frame members 42 of the feeding and aligning conveyor 22. The lower ends of these members have posts 43 which extend to the floor. The conveyor side frame members 42 are spaced by tubes 44, 45, 46, 47 and 48. These members also have suitable bearings in which are journalled shafts 41, 50 and 51. The shafts 41 and 51 have drive and driven sprockets 52 and 53, about which are trained conveyor chains 54 between certain chain pins 55 on which are pivotally mounted an endless series of rollers 56. Each of these rollers has provided at one end thereof a pulley 57 which is adapted to receive the upper flight of a spinner belt 58, the latter being trained about pulleys 59 and 60 which are mounted on shafts 50 and 51, the pulley 60 being freely rotatable on shaft 51 and the pulley 59 being fixed on the shaft 50.

Supported on an adjacent member 42 by spacers 65 is a spinner belt support 66 on which is mounted a section of roller chain 67, having rollers 68 which directly engage and support the upper flight of the spinner belt 58. The chain 54 adjacent the spinner belt 58 is unsupported so that the full weight of the adjacent ends of the rollers 56 rests directly on the upper flight of the spinner belt, thereby making a good frictional engagement between the pulleys 57 and the upper flight of this belt. The chains 54 in the upper flights thereof on both sides of the conveyor 22 are supported by rails 70 connected by spacers 71 to the adjacent conveyor frame members 42 excepting (as shown in Fig. 3) where the rollers 56 travel in contact with the spinner belt 58.

The feed conveyor 22 also includes longitudinal melon aligning bars 75. These are mounted on the lower ends of rods 76 which extend down from cross-bars 77, the ends of which are fixed on standards 78 provided on the conveyor side members 42 (see Figs. 1 and 3). The bars 75 divide the space across the conveyor into six lanes 79 along which the feed conveyor is adapted to convey melons to feed these to the stamping mechanism 23. It will be noted that the rollers 56 are provided in pairs 80, the rollers in each pair being spaced closed together than the spaces between adjacent pairs. The rearmost roller in each pair is also seen to be provided with shallow annular channels 81, one of these channels being provided in each roller so as to be centrally disposed with respect to each of the lanes 79. Thus in the conveyor 22 there are longitudinal rows of the channels 81 formed in the rearmost rollers of the pairs 80 of rollers 56 in the conveyor 22, one of said rows being in longitudinal alignment with each of the lanes 79. The effect of these channels and the inclination noted in the conveyor 22 is to prevent a melon delivered over the delivery board 85 to the conveyor 22 from coming to rest in between the rollers 56 of any pair 80, this causing the melons to roll rearwardly until these melons come to rest with one melon located in each of the wider spaces separating pairs 80 of rollers 56.

The rotation of the rollers 56 by the spinner belt 58 also causes the melons to continue rolling after they have become lodged in the spaces separating pairs 80 of rollers 56, this rotation of the melons as they are carried upwardly on the conveyor causing these all to be aligned with their major axes disposed parallel with the axes of the rollers 56 as clearly shown in Figs. 3, 5, 6, 7 and 8.

The conveyor 22 also includes a series of melon supporting delivery boards 86 which are fixed upon the frame channel iron 35, one of these boards being in alignment with each of the lanes 79 of the conveyor.

*Stamping mechanism 23*

This mechanism includes a shaft 90 which is rigidly held in an adjustable position in the bearings 33 by set screws 91, this shaft carrying type-wheel rests 92 which are rigidly fixed thereon. The stamping mechanism 23 includes a series of individual stamping devices 93, one of which is provided for each of the lanes 79. These devices are all driven by a shaft 94 journalled in suitable bearings in the standards 30 and each device 93 includes an arm 95 (see Fig. 7) and a hub 96 which is rotatably mounted on the shaft 94, and a boss 97 in which is fixed a shaft 98 on which is freely rotatable a type-wheel 99. Extending from each arm 95 on the same side thereof as the boss 97 is a stud 100 which is adapted to rest on a cushion 101 provided on the rest 92 when the arm 95 is in downwardmost position.

The arm 95 also carries a stub shaft 105 on which is rotatably supported a form roller 106 which is in radial alignment with the type-wheel 99. Each individual stamping device 93 also includes an ink supply roller 107 which is fixed on the shaft 94 and in alignment with the form roller 106 and in tangential contact therewith. Each ink supply roller 107 has a sprocket 108 formed thereon, this sprocket being connected by a chain 109 to a sprocket 110 provided on the type-wheel 99 of the individual stamping device 93. The periphery of each form roller 106 preferably comprises a rubber tire 115. A rubber tire 116 is also provided on the type-wheel 99, this being spaced from the tire 115 so that a block of type 117 removably mounted on the tire 116 comes into rolling contact with the form roller tire 115.

Gravity tends to cause each arm 95 and the device assembled thereon to swing downwardly about the shaft 96 until the stud 100 comes to rest against the cushion 101 and stops this rotation. Assisting gravity in this motion is a contractile spring 120, one end of which is connected to the rest 92 and the other end of which is connected to an arm 121 which is formed on the hub 96 of this arm 95 (see Figs. 7 and 9).

The stamping mechanism 23 also has a series of ink supply devices 122, there being one of these for each of the individual stamping devices 93. The ink supply devices are mounted on a pipe 130 which constitutes an ink reservoir the opposite ends of which are fixed upon the arms 34. Each of the supply devices includes an ink pump 131 having a face plate 132, one end of which is preferably secured as by welding to the tube 130. Secured as by screws 133 to the upwardly extending end of the plate 132 is a pump body 134, the latter having a bore 135 in the opposite ends of which are formed counterbores 136 and 137.

The bore 135 contains bearing sleeves 138, while a cap plate 139 confines packing material 140 in the counterbore 136. Journalled in the bearings 138 and extending outward through the packing material 140 and a central aperture in the plate 139 is a pump shaft 145. The inner end of the shaft 145 has an eccentric trunnion 146 on which is fitted a ball bearing roller 147. Entering the counterbore 137 tangentially are tube holes 148 and 149 through which a rubber pump tube 150 enters and leaves said counterbore. A single coil 151 of the tube 150 is formed in the counterbore 137, this tube where it passes under the roller 147 being squeezed closed between this roller and the surface of the counterbore 137, as shown in Fig. 10.

The outer ends of the holes 148 and 149 are beveled and suitable clamps 155 and 156 hold connecting nipples 157 and 158 in snugly sealed relation with ends of the pump tube 150. Penetrating the wall of the ink reservoir 130 opposite each of the ink supply devices 122 is a drain duct 159 which is connected to the nipple 157 of the adjacent ink supply device by a connecting tube 160.

Fixed on the extending end of the shaft 145 in spaced relation with the plate 139 is a ratchet wheel 165. Freely rotatable on the shaft 145 between the ratchet wheel 165 and the plate 139 is a ratchet arm 166, this arm having a pin hole 167 provided therein.

Pivotally connected to the arm 121 of the adjacent stamping device 93 is a ratchet actuating link 168, the latter having a slot 169. Extending through this slot and the hole 167 of the arm 166 is a ratchet pin 170. This pin has a shoulder 175 adjacent the head 176 on which is pivotally mounted a ratchet dog 177 and which is held against the arm 166 by a spring 178, the latter being trapped between the link 168 and a washer 185 which is held on the end of a pin 170 by a lock ring 186. The spring 178 thus holds the arm 166 and the link 168 constantly in frictional engagement with each other while the dog 177 is completely free to idle about the pin shoulder 175.

The dog 177 constantly rests downwardly in engagement with ratchet teeth 187 provided on the periphery of the ratchet wheel 165 so as to positively rotate this wheel when moving toward the wheel, there being a detent spring 188 fastened on the pipe 130 and extending into engagement with the teeth 187 to prevent reverse rotation of this wheel.

Provided on the frame cap plate 32 for each of the ink supply devices 122 is a fixed ratchet arm stop 190 and adjustable stop 191, these stops being located in the line of movement of the arm 166 of that device when it is rotated about its shaft 145.

Also fixed on the cap plate 32 and extending downwardly is a finger 195 which supports an ink tube 196, the latter being connected by a rubber tube 197 to the ink pump nipple 158, the tube 196 being positioned to discharge ink pumped by the pump 131 directly onto the ink supply roller 107 of the stamping device 93 associated therewith.

Drive mechanism 24

Journalled in suitable bearings on the standards 30 is a counter shaft 200 which is driven by an electric motor 201 connected by a belt 202 to a pulley 203 mounted on said shaft. On the same side of the machine as the pulley 203 the shaft 41 is provided with a sprocket 205 and the shaft 50 with a sprocket 206, these being connected by a chain 207.

On the opposite side of the machine the shaft 200 is provided with a sprocket 209, the shaft 94 with a sprocket 210, the shaft 50 with a sprocket 211 and a stub shaft 212 provided on the frame has a sprocket 213. Trained about the sprockets 209, 210, 211 and 213 is a chain 214.

Operation

To set the machine 20 in operation, the motor 201 is energized, causing the belt 202 to travel in the direction of the arrow 220. This produces rotation of the shafts 94, 41 and 50 in the direction of the arrows adjacent these shafts in Fig. 1. The pairs 80 of conveyor rollers 56 are thus caused to travel upwardly, as indicated in Fig. 3, to deliver melons M to the stamping mechanism 23.

The rotation of shaft 94 is transmitted through the chains 109 (Figs. 5 and 6) to the type-wheels 99 of the individual stamping devices 93. Being fixed on the shaft 94, the ink supply rollers 107 rotate constantly and their rotation is transmitted to the form rollers 106 by the constant frictional contact between these rollers. The rubber tire 115 on each of the form rollers 106 comes into a rolling or partial rolling and wiping contact with the block of type 117 provided on the tire 116 of the type-wheel 99. The ink supply roller 107 and the form roller 106 form an ink fountain for spreading out ink supplied thereby by the adjacent ink supply device 122 and feeding small quantities of the ink thus supplied to the type 117 each time this type is rotated into contact with the form roller tire 115.

Melons are fed from a suitable conveyor belt, not shown, across the drop board 85 (see Fig. 3) onto the conveyor 22, which, as already described, operates to cause the melons to distribute themselves along the various lanes 79 with one melon riding in the relatively wide space between each adjacent pair 80 of rollers 56. At the upper end of each lane 79 the melons M are delivered one at a time to each of the individual stamping devices 93. As these devices all operate in identically the same manner, a description of the operation of one will suffice for all. As already noted each of the melons M is independently rotated as it is conveyed upwardly so as to bring the major axis of this melon into parallelism with the axes of the rollers 56. This means, of course, that the major axis of each melon is parallel with the axis of rotation of the type wheel 99 which it engages (see Fig. 3) while it is still resting on two rollers 56 of the conveyor. Just before a melon M is delivered from the upper end of the conveyor 22 onto the delivery board 86 for that particular lane, it comes into contact with the type-wheel 99 disposed thereover and the friction between the rotating type-wheel and this melon rolls the melon onto the board 86 beneath the wheel and lifts the latter. The wheel 99 is rotated in such a timed relation with the drive shaft 41 of the conveyor that the type 116 moves around into contact with the surface of the melon, as shown in Fig. 6, as this melon rolls beneath the type-wheel. Thus the type prints a trade-mark or other indicia on the surface of this melon.

It is important to note that the delivery of each melon M into contact with a printing wheel 99 while this melon is still supported on rollers 56 of the conveyor, results in a printing operation being performed on that melon with the major axis of this melon parallel with the axis of the printing wheel. This is because after the melons have been uniformly positioned with their major axes parallel with the axes of the conveyor rollers 56 and the printing wheels 99 none of the melons is allowed to be disturbed so as to lose this position until it has passed entirely out of contact with the printing wheel 99 by which it is stamped.

This upward swinging of the wheel 99 incidental to the trade-marking of a melon by this wheel rocks the arm 121 rearwardly (as shown in Figs. 6, 7 and 9) this motion being transmitted to the link 168 and from this, through the friction set up by the ratchet pin 170, to the ratchet arm 166. This arm is thus swung from contact with its stop 190 to contact with its adjustable stop 191. Any excess motion of the link 168 above that necessary to produce this swinging of the arm 166 causes slippage between the link 168 and this arm so that regardless of how large a melon passes under the wheel 199, and the correspondingly large distance which this wheel is swung upwardly, the amount of movement of the ink feeding device arm 166 which is caused by this action is always the same, for a given adjustment of screw 191.

After a melon has been marked as above described and passes downwardly along the delivery board 86 from under the type-wheel thereabove, this wheel descends again to its lowermost position in which the stud 100 rests on the cushion 101. This thus draws the link 168 forwardly and frictionally returns the ratchet arm to its normal position in which it is resting against the stop 190, as shown in Figs. 5 and 10.

Reciprocation of the arm 166 just described which takes place when each melon passes underneath and is trade-marked by the type-wheel 99 causes a pre-determined amount of rotational movement in the ratchet wheel 165. This produces a given partial rotation of the shaft 145 and swings the roller 147 about its orbit in the pump 131 thereby pumping a minute but exactly pre-determined amount of ink along the rubber tube 150 and the other tubes connected therewith, this ink being discharged from the tube 196 onto the fountain roller 107.

It is thus seen that the type-wheel 99 of each of the ink stamping devices 93 rises from its lowermost position only in response to a melon passing therebeneath and that additional ink is fed from the ink supply device 122 to the stamping device in direct proportion to the number of melons stamped by this device. In other words, if no melons are stamped, no ink is fed. Furthermore, as the melons are stamped an amount of ink is fed in direct proportion to the number of melons stamped. Thus a relatively high degree of uniformity of wetness and darkness of the stamp applied is automatically produced in the operation of the machine. By regulation of the adjustable stop 191 it may be determined just how many teeth 187 of the ratchet 165 are passed over by the dog 177 during each reciprocation of the arm 166, and the amount of ink supplied to be used in the stamping of each melon thus controlled.

The positions of the rests 92 determine the lowermost position which will be assumed by the type-wheels 99 in the operation of the machine and this is controlled by the rotational adjustment of the shaft 90 while the screws 91 are temporarily loosened, so that in its lowermost position each of the type-wheels 99 will be low enough to stamp the smallest of the melons handled and yet will be raised by this melon a sufficient distance to operate, as above described, the ink supply device 122 associated with this type-wheel.

From the above description it will be seen that we have provided a novel stamping machine suitable for stamping many different kinds of rollable objects, and particularly fresh fruits and vegetables which are ovaloid in character, while it is also to be noted that melons and the like are specially suitable for stamping in this machine.

While pumps of the same general character as the pump 131 have previously made their appearance in the pump art, pump 131 has some very substantial advantages over all of its predecessors. For instance, in previous pumps using a coil of tube in a chamber such as the counterbore 137, the tube has been bent as it comes out of this chamber so that the incoming and outgoing ends of the tube lie close together and parallel. This has been found to produce strains in this tube where it is thus bent which causes early breakdown of the tube in the portion bent. In the present construction this breakdown is entirely eliminated by the opposite ends of the tube passing out of the pump chamber through tangential passageways.

While the machine shown in the drawings is especially adapted for the stamping of melons, it is to be understood that with suitable modifications it may be rendered equally effective in the stamping of other rollable products. Wherever used in the specification or claims, therefore, the term "melon" is to be understood as embracing all of those products which said machine may, with or without modification, be used to stamp.

While we have shown and described only a single embodiment of the invention herein, it is to be understood that various changes might be made in this without departing from the spirit of the invention or the scope of the appended claims.

We claim:

1. In a stamping machine, the combination of: means for delivering a series of melons to a stamping station and for supporting said melon when at said station; a rotary type-wheel disposed above said station; means for mounting said wheel to permit the same to yield upwardly when contacted with a melon delivered to said station; means for rotating said wheel continuously so as to make rolling contact between said wheel and said melon as the latter crosses said station; type provided on the periphery of said wheel and adapted to be brought into stamping relation with each melon crossing said station; means for coordinately operating said delivery means and said wheel rotating means to bring said type into stamping relation with each melon passing under said wheel; inking means for evenly spreading ink over said type on said wheel; and means responsive to each lifting of said wheel caused by the melon passing therebeneath to supply a given quanutity of ink to said inking means.

2. In a stamping machine, the combination of: a roller conveyor having transverse rollers with spaces therebetween for receiving ovaloid objects to be stamped; means for rotating said rollers to bring the major axes of objects carried thereon into parallelism with the rollers of said conveyor; and means for printing a mark on each of said objects, said means being positioned to contact said object while the latter is still supported on a pair of the rollers of said conveyor with the major axis of said object in parallelism with said rollers said printing means remaining in contact with said object to print a mark thereon while retaining said object with its axis parallel with said rollers.

3. In a stamping machine, the combination of: a roller conveyor having transverse rollers with spaces therebetween for receiving ovaloid objects to be stamped; means for rotating said rollers to bring the major axes of objects carried thereon into parallelism with the rollers of said conveyor; and a rotary printing means, the axis of which is parallel with the axes of said objects traveling on said conveyor, said rotary printing means being positioned to be contacted by each of said objects before the latter is disturbed from its position aforesaid on a pair of the rollers of said conveyor and remain in contact with said object to maintain the axis of said object parallel with the axis of said printing means through a printing operation in which said printing means prints a mark on said object.

4. In a stamping machine, the combination of: a roller conveyor having transverse rollers with spaces therebetween for receiving ovaloid objects to be stamped; means for rotating said rollers to bring the major axes of objects carried thereon into parallelism with the rollers of said conveyor; a rotary printing means disposed adjacent the discharge end of said conveyor, the axis thereof being disposed parallel with the axes of said rollers; and a delivery board cooperatively associated with said printing means, said conveyor delivering each of said objects into contact with said printing means while said object still rests on a pair of said conveyor rollers with the major axis of said object parallel with said rollers; and means for rotating said rotary printing means to roll each such object over said delivery board to increase the space between said delivery board and said printing means and move said object away from said conveyor while performing a printing operation on said object with the major axis of said object parallel with the axis of said rotary printing means.

5. In a stamping machine, the combination of: a roller conveyor having transverse rollers with spaces therebetween for receiving ovaloid objects to be stamped; means for rotating said rollers to bring the major axes of objects carried thereon into parallelism with the rollers of said conveyor; and a printing means including a delivery member and a rotary member and type faces associated with one of said members, said printing means being located at the discharge end of said conveyor so that each of said objects is delivered into contact with said rotary member while said object still rests on a pair of said conveyor rollers and with the major axis of the object parallel with said rollers; and means for rotating said rotary member to roll each object delivered thereto as aforesaid, between said members and thereby apply said type means to said object to print a mark thereon while the major axis of said object remains parallel with said rotary member.

6. In a stamping machine, the combination of: an endless travelling roller conveyor having transverse rollers with spaces therebetween for receiving ovaloid objects to be stamped; means for rotating said rollers as they travel to bring the major axes of objects carried thereon into parallelism with the rollers of said conveyor; and means for printing a mark on each of said objects, said means being positioned to come into rolling contact with said object while the latter is still supported on a pair of the rollers of said conveyor with the major axis of said object in parallelism with said rollers, said printing means remaining in rolling contact with said object to print a mark thereon while retaining said object with its axis parallel with said rollers.

7. In a stamping machine, the combination of: an endless travelling roller conveyor having transverse rollers, adjacent pairs of which provide spaces for receiving ovaloid objects to be stamped, there being annular channels formed in certain of said rollers, one of said channels being formed in one of the rollers of each of said pairs, said channels all being symmetrical with respect to a given plane which vertically and axially bisects a desired path of travel for said objects on said conveyor; means for rotating said rollers as they travel to bring the major axes of objects carried thereon into parallelism with the rollers of said conveyor, and to position said objects in alignment in said path; and means operating in said plane for printing a mark on each of said objects, said means being positioned to come into rolling contact with said object while the latter is still supported on a pair of the rollers of said conveyor as so aligned and with the major axis of said object in parallelism with said rollers, said printing means remaining in rolling contact with said object to print a mark thereon while retaining said object in said path and with its axis parallel with said rollers.

GERALD C. PAXTON.
ERNEST A. VERRINDER.